United States Patent [19]

Pollock

[11] 4,379,700
[45] Apr. 12, 1983

[54] MULTIPLICATION/DIVISION TUTORIAL GAME

[76] Inventor: Clyde Pollock, 42665 Roberts Ave., Fremont, Calif. 94538

[21] Appl. No.: 264,467

[22] Filed: May 18, 1981

[51] Int. Cl.³ .......................... G09B 19/02; A63F 1/00
[52] U.S. Cl. ..................................... 434/208; 273/299
[58] Field of Search .............. 434/190, 191, 192, 208, 434/209, 210; 273/272, 299, 302

[56] References Cited

U.S. PATENT DOCUMENTS

| | | |
|---|---|---|
| 1,246,152 | 11/1917 | Perrine . |
| 1,402,807 | 1/1922 | Tegtmeyer ...................... 434/191 X |
| 2,205,440 | 10/1940 | Maximon et al. ........................ 35/31 |
| 2,769,640 | 12/1956 | Elder ..................................... 273/135 |
| 2,901,839 | 11/1959 | Huff ........................................ 35/70 |
| 3,501,854 | 9/1970 | Hollingsworth ........................ 35/31 |
| 3,571,953 | 3/1971 | Hassell, Jr. ........................... 434/209 |
| 4,173,834 | 11/1979 | Arzola .................................... 35/31 |

FOREIGN PATENT DOCUMENTS 857260 4/1940 France ................................. 434/209

Primary Examiner—William H. Grieb
Attorney, Agent, or Firm—David Pressman

[57] ABSTRACT

A multiplication-division game containing chips (16) representing multiplication products and playing cards (14) representing multiplier-multiplicand combinations which equal the products of said chips. Each player has a placemat (10) for holding dealt and drawn cards. The chips are arranged in three piles (16) and the players take turns trying to capture the chips by combining pairs of cards whose products equal those of any one of the three top chips. The player who captures the most chips is declared winner; successful multiplier-multiplication cards being discarded. The players alternate play; with each turn a player draws a new card from a stack and matches pairs of cards against the chips until such player can no longer capture any more chips.

10 Claims, 1 Drawing Figure

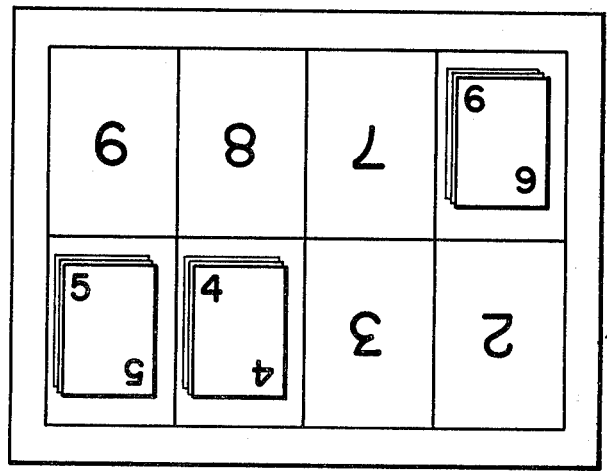
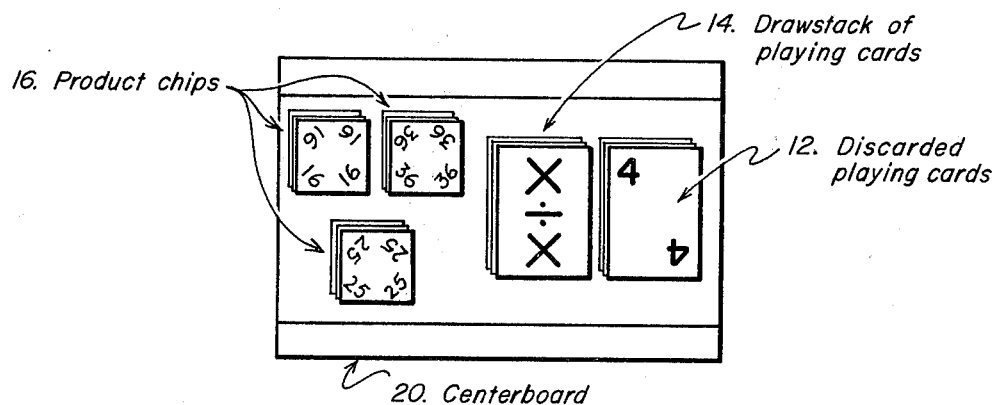
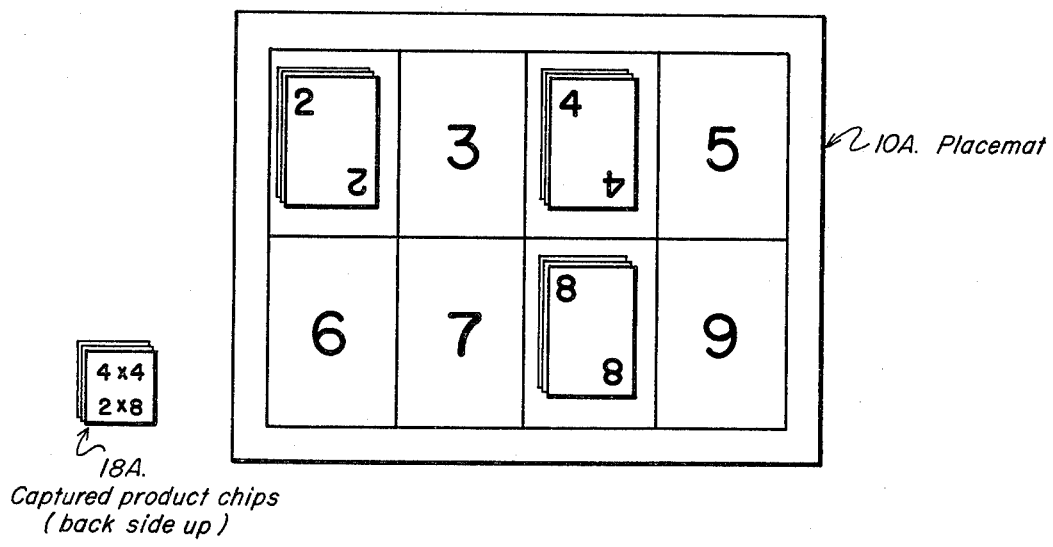

MULTIPLICATION/DIVISION TUTORIAL GAME

BACKGROUND

1. Field of Invention

This invention relates to games, particularly to a game which may be employed to teach children and others multiplication and division.

2. Description of Prior Art

Heretofore many types of multiplication and/or division tutorial games have existed. These employed cards, boards, chips, and combinations of the latter. However, while apparently useful, such games in reality were relatively complex to understand and were not suitable for those at the lower education level where basic learning and drill of the multiplication table and simple division is desirable. Tutorial games of a very elemental nature have been proposed, but these were of such great simplicity that they would not hold a student's interest for a sufficiently long time to enable learning to take place. In addition to these drawbacks, the games of the prior art were playable at one level of skill only and hence had to be designed at a compromise level which was too difficult for beginning learners and which did not provide sufficient stimulation for advanced learners. Lastly, the games of the prior art were relatively prosaic and therefore became boring in relatively short order. As is well known, the most effective learning occurs when the student is highly interested in and enjoys the learning process.

Accordingly, several objects of the present invention are to provide a multiplication and/or division game which is readily understandable by a beginning student, yet which is complex enough to hold the student's interest during learning, can be played at various levels of difficulty for students at various stages of learning, and is highly enjoyable to play. Further objects and advantages will become apparent from a consideration of the ensuing description thereof.

DRAWINGS

The single FIGURE of drawing shows a layout of a game in play in accordance with the invention.

DESCRIPTION OF GAME

The multiplication-division game of the invention consists of four basic components: individual-player placemats, multiplier-multiplicand or playing cards, a centerboard, and product chips. The drawing shows a two-player game in progress, the players (not shown) using respective placemats 10A and 10B. Each placemat may be about 31×43 cm. (12×16 in.) in size and is divided into two horizontal rows of four rectangles each, such rectangles being sequentially numbered from 2 to 9. As indicated, the rectangles are designed for holding cards having the same respective numbers as the rectangles. Six placemats preferably are supplied with the game, but any number of players from one (solitaire) to six can play. The placemats are not essential to the invention, but are provided as a convenient place for each player to place cards in play.

Each playing card has a number (which may be regarded as either a multiplicand or multiplier) from 2 to 9 printed at opposite corners on the face side thereof, as indicated by the top card in a discard pile 12, which has the number "4" on the face thereof. The reverse side of each card is blank and may have a multiplication-division or other design thereon, as indicated by the top card in drawstack 14. The cards may be rectangular in shape and of playingcard size. In the game version under consideration, ninety-two cards are provided. The quantity of cards for each multiplicand-multiplier number is indicated in the card/chip table below.

The product chip cards are 5 cm. (2 in.) square cards which carry on the face thereof numbers representing products of all possible pairs of playing cards, as indicated in the card/chip table below. Typical chips are indicated at the top of each of the three stacks of playing chips 16. Each number is duplicated four times, once in each corner of the chip, for ease of reading. The reverse side of each chip contains the multiplicand-multiplier pair, or pairs, which equals the product on the face of the chip; a typical chip's reverse side is indicated by the top chip in pile 18A of captured chips. This chip has the multiplier-multiplicand pair 4×4 and 2×8; thus the product on the face of the chip (not shown) is 16. In the game version under consideration, thirty-six chips are provided with values indicated in the table below.

The chips and playing cards are color-coded for various levels of difficulty of play. At the easiest level, identified as Level II or the yellow level, a chip is provided for each product of the common multiplier 2 for each sequential multiplicand from 2 to 9, i.e., from the product 4 (2×2) to the product 18 (2×9). As indicated in the chip/card table below, Level II contains twenty-two cards and chips. Each card and chip is identified by a yellow border or yellow color to indicate that it belongs to the yellow or easiest level. Level II includes all playing cards necessary to achieve the products for every possible combination of multipliers and multiplicands from 2 to 9 using at least one "2."

In addition, since certain of these products in the two table can be achieved by multiplier-multiplicand pairs without using the common multiplier "2," additional playing cards are provided for these pairs. E.g., the product 12 is attainable by the multiplier-multiplicand pair 3×4 as well as 2×6; thus an extra "3" card and an extra "4" are provided to teach, at Level II, that the product 12 can be achieved by the multiplier-multiplicand pair 3×4, as well as 2×6. Similarly, since the products 16 and 18 in the "2" table also have "non-2" multiplier-multiplicand pairs (4×4 and 3×6), playing cards are also provided for these pairs.

In all, sixteen cards are provided for those eight multiplier-multiplicand pairs using a "2" and six extra cards are provided for these products which can be reached by "non-2" multiplier-multiplicand pairs; thus a total of twenty-two cards are provided in the Level II portion.

Level III (orange) employs twenty cards and seven chips, as indicated in the table, to cover all of the products from 9 to 27 of the multiplier 3, including additional cards to cover the "non-3" multiplier-multiplicand pairs which equal the products in Level III.

The successive levels III to VIII are respectively colored as indicated in the table and comprise the cards and chips in the respective quantities indicated.

In the table under "Multiplier-Multiplicand Playing Cards," the column labeled "Card No." indicates numbers on the faces of the cards, e.g., face number "4" as indicated on the top card of discard pile 12, while the numbers in the corresponding row of the "Quantity" column indicate the number of cards having the respective face values which are provided in the set for that level.

Under "Product Chips," the column headed "Face" indicates the product numbers on the faces of the chips, e.g., the numbers indicated on any of the top three chips in the three respective stacks 16, while the multiplier-multiplicand pairs in the corresponding row entries in the column labeled "Reverse" indicate the multiplier-multiplicand pairs on reverse sides of the chips, e.g., as indicated on the top chip of pile 18A.

| TABLE OF VALUES FOR QUANTITIES FOR PLAYING CARDS AND PRODUCT CHIPS | | | | |
|---|---|---|---|---|
| | MULTIPLIER/ MULTIPLICAND (PLAYING CARDS) | | PRODUCT CHIPS | |
| | QUANTITY | CARD NR. | FACE | REVERSE |
| LEVEL II (YELLOW) | 9 | 2 | 4 | $2 \times 2$ |
| 22 cards 8 chips | 3 | 3 | 6 | $2 \times 3$ |
| | 4 | 4 | 8 | $2 \times 4$ |
| | 1 | 5 | 10 | $2 \times 5$ |
| | 2 | 6 | 12 | $2 \times 6; 3 \times 4$ |
| | 1 | 7 | 14 | $2 \times 7$ |
| | 1 | 8 | 16 | $2 \times 8; 4 \times 4$ |
| | 1 | 9 | 18 | $2 \times 9; 3 \times 6$ |
| LEVEL III (ORANGE) | 2 | 2 | 9 | $3 \times 3$ |
| 20 cards 7 chips | 8 | 3 | 12 | $3 \times 4; 2 \times 6$ |
| | 2 | 4 | 15 | $3 \times 5$ |
| | 1 | 5 | 18 | $3 \times 6; 2 \times 9$ |
| | 3 | 6 | 21 | $3 \times 7$ |
| | 1 | 7 | 24 | $3 \times 8; 4 \times 6$ |
| | 1 | 8 | 27 | $3 \times 9$ |
| | 2 | 9 | | |
| LEVEL IIII (RED) | 1 | 2 | 16 | $4 \times 4; 2 \times 8$ |
| 18 cards 6 chips | 1 | 3 | 20 | $4 \times 5$ |
| | 7 | 4 | 24 | $4 \times 6; 3 \times 8$ |
| | 1 | 5 | 28 | $4 \times 7$ |
| | 3 | 6 | 32 | $4 \times 8$ |
| | 1 | 7 | 36 | $4 \times 9; 6 \times 6$ |
| | 3 | 8 | | |
| | 1 | 9 | | |
| LEVEL V (PINK-VIOLET) | 6 | 5 | 25 | $5 \times 5$ |
| 10 cards 5 chips | 1 | 6 | 30 | $5 \times 6$ |
| | 1 | 7 | 35 | $5 \times 7$ |
| | 1 | 8 | 40 | $5 \times 8$ |
| | 1 | 9 | 45 | $5 \times 9$ |
| LEVEL VI (BLUE-VIOLET) | 1 | 4 | 36 | $6 \times 6$ |
| | 5 | 6 | 42 | $6 \times 7$ |
| 10 cards 4 chips | 1 | 7 | 48 | $6 \times 8$ |
| | 1 | 8 | 54 | $6 \times 9$ |
| | 2 | 9 | | |
| LEVEL VII (BLUE) | 4 | 7 | 49 | $7 \times 7$ |
| 6 cards 3 chips | 1 | 8 | 56 | $7 \times 8$ |
| | 1 | 9 | 63 | $7 \times 9$ |
| LEVEL VIII (DARK GREEN) | 3 | 8 | 64 | $8 \times 8$ |
| | 1 | 9 | 72 | $8 \times 9$ |
| 4 cards 2 chips | | | | |
| LEVEL VIIII (LIGHT GREEN) | 2 | 9 | 81 | $9 \times 9$ |
| 2 cards 1 chip | | | | |

The centerboard is shown at 20. It also is not an essential compoment of play, but is provided for convenience of consistent placement of the three piles of product chips, the drawstack, and the discard pile of playing cards. Centerboard 20 may be about 22 cm. × 36 cm. (8.5 × 14 in.) and has labeled rectangles (not shown) under the card piles, as follows: "Chip Stack" (three squares), "Draw Pile (face down)", and "Discard Pile (face up)".

DESCRIPTION OF PLAY

The object of the game is to capture as many product chips as possible. To capture a chip, a player must pick and provide from such player's placemat two playing cards whose product equals that on any top chip in piles 16. The player thereupon captures the product chip and places it in such player's pile of captured chips.

At the beginning of play, the thirty-six chip cards in the game are shuffled and divided into three stacks of twelve each, as indicated at 16. The chip cards are placed on the three labeled blocks of centerboard 20 with the face or product sides of the chips up. The playing cards are shuffled, and each player is dealt five cards. Each player thereupon arranges the dealt cards face up on such player's gameboard 10, on corresponding numbered spaces, as indicated. The remainder of the playing cards are placed face down on centerboard 20 to provide a drawstack 14.

The first player chosen, e.g., by a roll of dice or by a high-card draw, draws a playing card from drawstack 14. This player tries, using the drawn card and the dealt cards, to multiply any two cards to equal any of the three products on any of the three top playing chips in piles 16. For example, in the game illustrated, the player of placemat 10A can capture the top playing chip in the leftmost of stacks 16 of product chips (bearing the product 16) with either two 4-cards from Player A's stack of 4's, or a 2 and an 8 from Player A's stack of 4's and 8's, respectively.

Upon capturing the product chip, player A puts it on or starts a stack of captured chips 18A and places the pair of playing cards which multiplied to the product on the captured chip face up in the pile of discard cards 12. Player A may turn the captured product chip card upside down as indicated at 18A to verify the multiplication, or can leave the chip topside up, as indicated at 18B.

Thereafter, Player A may select two new replacement cards from drawstack 14. Player A continues to capture chips by this method until all of Player A's possible product-producing pairs of playing cards are exhuasted. Each time a player captures a chip, the next lower chip in the stack will be exposed and will be in play.

If upon a player's turn he or she has no pair of playing cards which multiply to the product on any exposed playing chip, such player will draw a new card from drawstack 14 and place it upon the appropriate rectangle on such player's placemat 10. If, with the new card drawn, together with the five previous cards dealt, the player can capture any product chip card, such player will discard the appropriate playing cards and capture the chip. However, if after drawing a playing card, none of the exposed chips can be captured, play is shifted to the opposite or next player, who draws a card and tries to capture chips in similar fashion.

If drawstack 14 is exhausted during play, discard pile 12 is shuffled and made the drawstack. If any of product chip stacks 16 become exhausted, the remaining two stacks of chips are divided into three stacks. If a player tries to capture a product chip with a pair of playing cards which don't multiply to the product on a chip, that player is penalized by having to forfeit the illegal pair of playing cards, the illegally captured chip, and one of such player's previously-captured legal chips. Forfeited chips are placed at the bottom of one of stacks 16 and forfeited playing cards are placed in discard pile 12.

The game can also be viewed as a division-teaching game since a product chip can be captured if the product on such chip, divided by the value on any of a player's playing cards, equals the value on any other of a player's playing cards. E.g., Player A can capture the chip bearing the product "16" by either (I) dividing the "16" by the divisor on one playing card and using another "4" card to match the resultant dividend (4), i.e., 16/4=4, or (II), dividing the "16" by 8 or 2 to match the resultant dividend (8), i.e., 8=16/2 or 2=16/8.

The game preferably is played with two to six players in competition. The player with the most captured chips, when all chips are exhausted, is considered the winner. The game can also be played as a solitaire game with one player. In this case all the chips would be stacked in one pile and the player would deal all the playing cards in the deck face up by simply sorting them onto the placemat and trying to capture all of the chips in the stack.

For those players who are not familiar with the multiplication table, such as young children, the game can be played at a very elementary level with only the products of two by playing the game as described above, but with only the twenty-two playing cards and eight chip cards which are colored yellow for Level II, as indicated in the table above. (If the player is not even familiar with the two-times table, he or she can play the game with the product chips reverse side up, as shown at 18A, until the table is learned.) When the player has mastered yellow Level II, an additional level of difficulty can be added by playing with all of the yellow pieces and all of the orange pieces, thereby to play the "two-times" table and the "three-times" table.

Once these tables are mastered, Levels IV, V, etc., can be sequentially added until the player masters the entire multiplication table.

If a player has difficulty with any part of the table, say the Level IV, or the "four-times" table, that player can play the game, either as a solitaire or in competitive play, with just the red cards so as to concentrate on this level until it is mastered.

I have found that the present game is readily learned by even beginners in multiplication and division, yet is extremely effective tutorially and at the same time provides great enjoyment and recreation for those playing. I have found that even children who have had great difficulty learning and mastering the multiplication tables have made remarkable progress after playing the game of the invention for only a short time.

While the above description contains many specificities, these should not be considered as limitations upon the scope of the invention, but rather as an exemplification of one preferred embodiment thereof. Many ramifications of the invention will occur to those skilled in the art. For example, the game can be emulated entirely electronically on a video screen, the shapes and names of playing pieces can be interchanged (playing cards would represent the products and chips would represent the multiplier-multiplicand pairs), other shapes of pieces can be used, higher numbers than 9 can be used, different numbering systems can be used, et cetera. Accordingly the scope of the invention should be determined only by the appended claims and their legal equivalents.

I claim:
1. A multiplication/division tutorial game comprising:
   (a) a plurality of product pieces, each bearing at least one occurrence of multiplication product number such that each product piece represents a different multiplication product, and such that said plurality of product pieces represent a set of multiplication products
   (b) a plurality of multiplier-multiplicand pieces, each bearing at least one occurrence of a whole multiplier-multiplicand number such that each multiplier-multiplicand piece represents only a single multiplier or multiplicand, said multiplier-multiplicand pieces comprising all possible multiplier-multiplicand number combinations of a given set of whole numbers which can be multiplied to equal the set of product numbers represented by said plurality of product pieces.
2. The game apparatus of claim 1 wherein said product pieces comprise the products of multiplier 2 and multiplicands from 2 to 9 inclusive.
3. The game apparatus of claim 1 further including a plurality of placemats, each placemat having a plurality of spaces for the respective numbers of said set of numbers.
4. The game apparatus of claim 1 wherein said product pieces are chips with a product number on one side thereof and at least one multiplier-multiplicand combination of numbers for said product number on the reverse side thereof.
5. The game apparatus of claim 1 wherein said multiplier-multiplicand pieces are cards, each card having only a single multiplier or multiplicand number on one side thereof only.
6. The game apparatus of claim 1 wherein said product pieces are chips with a product number on one side thereof and at least one multiplier-multiplicand combination of numbers for said product number on the reverse side thereof, and said multiplier-multiplicand pieces are cards, each card having a multiplier-multiplicand number on one side thereof only.
7. The game apparatus of claim 1 wherein said product pieces represent all the multiplication product numbers of all possible multiplier-multiplicand combinations of numbers from two to nine and said multiplier-multiplicand pieces comprise all the possible multiplier and multiplicand numbers only a single multiplier or multiplicand from two to nine which equal the respective product numbers of said chips.
8. The game apparatus of claim 1 wherein said product pieces are composed of a plurality of groups, each group being identified by a respective indicium, the indicia for respective groups being different, the pieces of one group representing all the product numbers of a given multiplier number and a series of sequential multiplicand numbers within a given range, the pieces of another group representing all the product numbers of a multiplier higher than said given multiplier number in a series of sequential multiplicand numbers within a given group.
9. The game apparatus of claim 8 wherein said indicia are colors, the product pieces of each group having a different color.
10. The game apparatus of claim 9 wherein for each group of product pieces there are provided a group of multiplier-multiplicand pieces for the combinations of multiplier-multiplicand numbers which yield the product numbers of said group, each multiplier-multiplicand piece bearing the same indicium as its corresponding product pieces.

* * * * *

UNITED STATES PATENT AND TRADEMARK OFFICE
CERTIFICATE OF CORRECTION

PATENT NO. : 4,379,700
DATED : 1983 Apr 12
INVENTOR(S) : Pollock, Clyde

It is certified that error appears in the above-identified patent and that said Letters Patent are hereby corrected as shown below:

Claim 7, lines 5 to 7: change "comprise all the possible multiplier and multiplicand numbers only a single multiplier and multiplicand from two to nine" to --comprise all the possible single multiplier or multiplicand numbers from two to nine--.

Signed and Sealed this

Twenty-sixth Day of February 1985

[SEAL]

Attest:

DONALD J. QUIGG

Attesting Officer

Acting Commissioner of Patents and Trademarks